United States Patent
Jansen

(10) Patent No.: US 9,086,168 B1
(45) Date of Patent: Jul. 21, 2015

(54) GHE SOLENOID OPERATED PRESSURE REGULATOR AND GAS RELEASE MANIFOLD

(71) Applicant: Jansen's Aircraft Systems Controls, Inc., Tempe, AZ (US)

(72) Inventor: Harvey B. Jansen, Mesa, AZ (US)

(73) Assignee: Jansen's Aircraft Systems Controls, Inc., Tempe, AZ (US)

( * ) Notice: Subject to any disclaimer, the term of this patent is extended or adjusted under 35 U.S.C. 154(b) by 69 days.

(21) Appl. No.: 14/012,953

(22) Filed: Aug. 28, 2013

Related U.S. Application Data

(60) Provisional application No. 61/694,098, filed on Aug. 28, 2012.

(51) Int. Cl.
*B01F 5/04* (2006.01)
*F16K 31/06* (2006.01)

(52) U.S. Cl.
CPC ...................... *F16K 31/06* (2013.01)

(58) Field of Classification Search
USPC ............ 137/595, 597, 898, 607, 606, 625.18, 137/870; 251/129.15, 333, 359, 362, 364, 251/368
See application file for complete search history.

(56) References Cited

U.S. PATENT DOCUMENTS

| | | | |
|---|---|---|---|
| 2,059,808 A | 11/1936 | Braxton et al. | |
| 2,096,763 A * | 10/1937 | Ray et al. | 335/245 |
| 2,679,856 A | 6/1954 | Gerritsen et al. | |
| 2,857,184 A | 10/1958 | Mancusi, Jr. | |
| 2,919,714 A | 1/1960 | Mrazek | |
| 3,057,630 A | 10/1962 | Sneed | |
| 3,068,018 A | 12/1962 | Tydeman | |
| 3,099,285 A | 7/1963 | Berg et al. | |
| 3,138,175 A | 6/1964 | Chilcoat | |
| 3,150,687 A * | 9/1964 | Kalle | 137/625.4 |
| 3,415,269 A | 12/1968 | Salerno | |
| 3,418,001 A | 12/1968 | Rentschler et al. | |
| 3,455,566 A | 7/1969 | Hull et al. | |
| 3,473,783 A | 10/1969 | Self | |
| 3,703,185 A | 11/1972 | Usry | |
| 3,805,835 A | 4/1974 | Jansen | |
| 3,863,810 A * | 2/1975 | Hanson | 222/129.1 |
| 4,026,327 A | 5/1977 | Deinlein-Kalb | |
| 4,109,921 A | 8/1978 | Urbaschek | |
| 4,327,772 A | 5/1982 | Kawabata | |
| 4,344,453 A | 8/1982 | Tuchenhagen et al. | |
| 4,418,559 A | 12/1983 | Huzyak | |
| 4,501,298 A | 2/1985 | Inada et al. | |

(Continued)

*Primary Examiner* — Kevin Murphy
*Assistant Examiner* — R. K. Arundale
(74) *Attorney, Agent, or Firm* — Quarles & Brady LLP

(57) ABSTRACT

A pressure regulator includes a pressurized fluid, direct-drive, balanced dual poppet valve assembly that requires no dynamic seals and is pressure balanced. Each poppet has a knife edge that creates a bubble-tight seal against a cooperating seat. The sealing knife edge of one poppet faces into the pressure, and the sealing knife edge of the other poppet faces away from the pressure. The pressure balance negates performance impact of high or low fluid pressure. Furthermore, the design provides for a controlled depth of deformation by the sealing knife edges of the poppets into the soft surfaces of the seats. With this arrangement, no dynamic seals are required, reducing the friction to a very low value. The valve assembly is actuated by solenoid that is optimized for light weight, high speed response, and low power consumption. The solenoid is designed to be immersed and operated within the pressurized fluid.

16 Claims, 8 Drawing Sheets

(56) References Cited

U.S. PATENT DOCUMENTS

| | | | |
|---|---|---|---|
| 4,655,253 A | 4/1987 | Ourensma | |
| 4,719,749 A | 1/1988 | Greune et al. | |
| 5,066,029 A | 11/1991 | Gill | |
| 5,157,947 A | 10/1992 | Weirich et al. | |
| 5,332,000 A * | 7/1994 | Gassner | 137/543.23 |
| 5,474,104 A * | 12/1995 | Borland et al. | 137/381 |
| 5,556,075 A | 9/1996 | Weber | |
| 6,148,858 A | 11/2000 | Kirkman | |
| 6,173,785 B1 | 1/2001 | Adams et al. | |
| 6,244,291 B1 | 6/2001 | Hughes | |
| 6,390,129 B2 | 5/2002 | Jansen et al. | |
| 7,004,449 B2 | 2/2006 | Jansen | |
| 7,121,525 B2 | 10/2006 | Gelez | |
| 2003/0160197 A1 | 8/2003 | Kodama | |
| 2004/0184937 A1 | 9/2004 | Hueppchen | |
| 2004/0238773 A1 | 12/2004 | Wang et al. | |
| 2006/0070655 A1 | 4/2006 | Tebby | |
| 2009/0308614 A1 * | 12/2009 | Sanchez et al. | 166/328 |
| 2013/0340869 A1 * | 12/2013 | Peel | 137/606 |

* cited by examiner

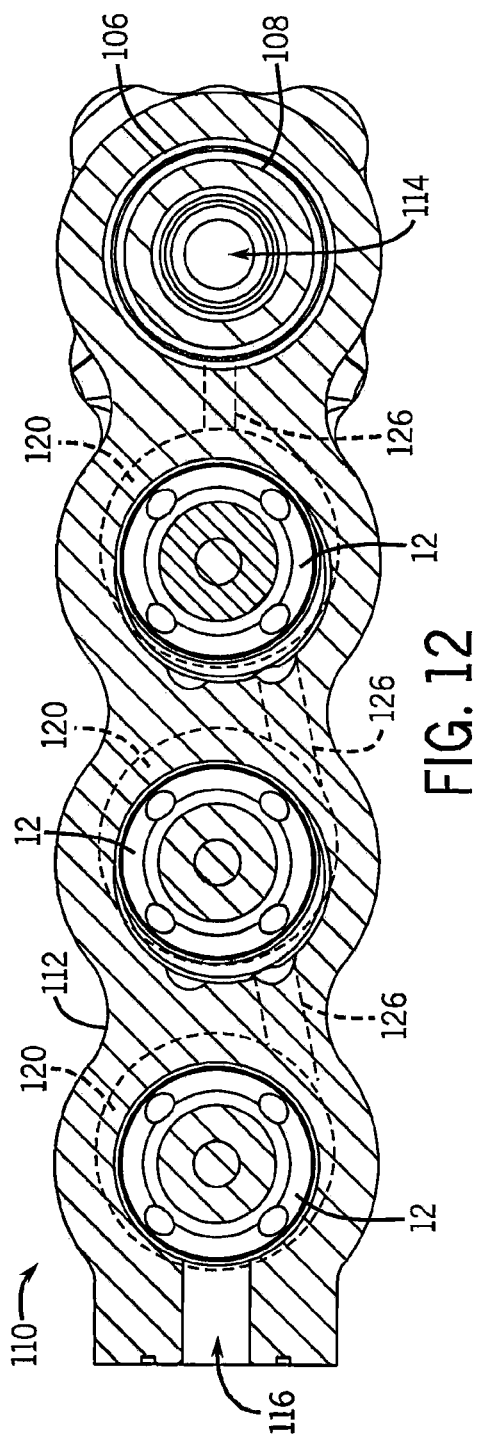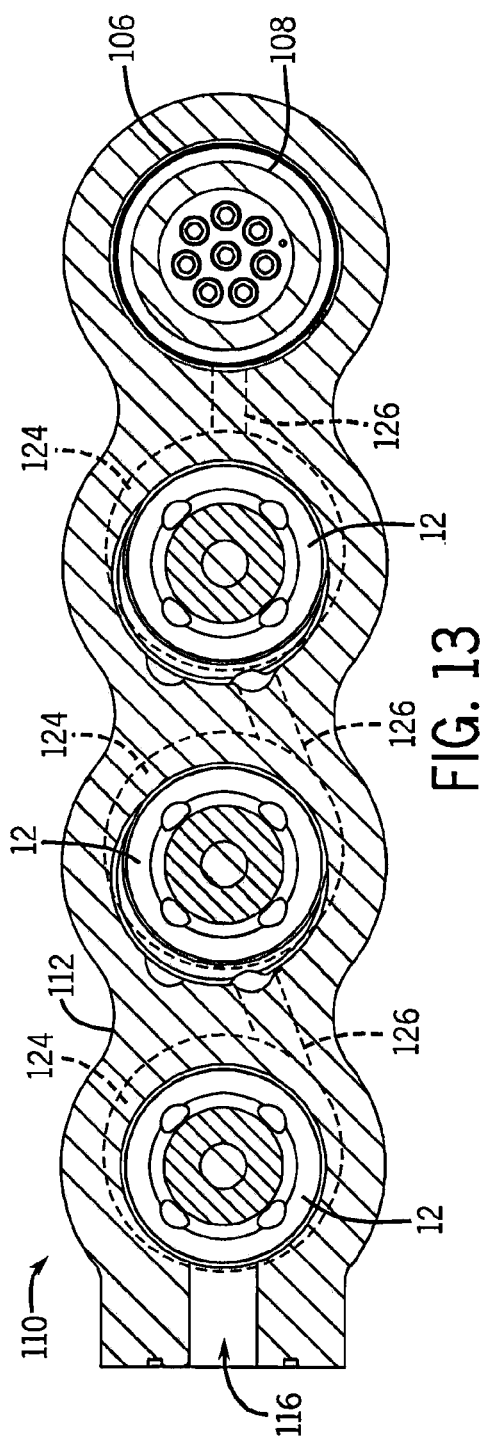

GHE SOLENOID OPERATED PRESSURE REGULATOR AND GAS RELEASE MANIFOLD

CROSS-REFERENCE TO RELATED APPLICATIONS

This application is a non-provisional and claims the benefit of U.S. provisional application No. 61/694,098 filed on Aug. 28, 2012, the entire disclosure of which is incorporated by reference as though fully set forth herein.

STATEMENT OF FEDERALLY SPONSORED RESEARCH OR DEVELOPMENT

This invention was made with government support under NNK12MS01S awarded by the National Aeronautics and Space Administration. The government has certain rights in the invention.

BACKGROUND

The present disclosure relates to pressurized gas release valves, and more particularly, to a solenoid-operated pressure-balanced poppet valve having no dynamic seals.

Poppet valves are commonly used in flow control applications where release of a gas from the valve must be controlled in both timing and quantity. As a simplistic example, a poppet valve has a channel that is closed off by a biased poppet, which is a disc-shaped plug on the end of a shaft. The poppet may be held closed against a seat by a spring, and may further be held closed by a pressure differential across sides of the poppet. A change in the pressure differential can either open or close the poppet depending on how it is configured.

In a balanced poppet valve, all forces acting on the poppet are substantially equal in the equilibrium (closed or open, hereinafter "balanced") state, so that only a small force is needed to actuate the valve. Typically, the balanced state is closed, with a light gauge spring holding the poppet closed. A balanced poppet valve may be actuated by a solenoid, which magnetic force only has to overcome the biasing force of the spring to actuate the valve. The low force required allows for quick actuation.

Balanced poppet valves with a single poppet are employed in a wide range of applications, including industrial process controls and internal combustion engines. In high-pressure applications, balanced poppet valves having two coaxial poppets improve the valve functionality over a single poppet because the pressure on one plug balanced the pressure on the other. Such two-poppet valves were used as early as the mid-19th century in steam engines, and into the 20th century they were used with solenoid actuators for some metering applications. However, historically such valves have suffered from a widely-acknowledged leakage problem due to the design and materials used. In particular, relatively modern two-poppet pressure-balanced valves have metal seats, which are durable but do not create a reliable seal for the two metal poppets that must be seated simultaneously. Thus, application of modern two-poppet balanced valves is limited to uses where direct solenoid drive of the valve is needed but leakage is not critical.

Previous attempts to overcome the drawbacks of balanced poppet valves in high-pressure applications where leakage is critical have utilized one or more dynamic seals to address the leakage. A dynamic seal is created between two surfaces that are moving relative to each other. Such a seal generates a large amount of friction. In pressure-balanced poppet valve, the friction from the dynamic seal requires generation of additional force to overcome it when actuating the valve. In turn, a larger and heavier solenoid is needed to generate the additional force.

Thus, existing balanced poppet valve designs are unsuitable for ultra-high performance applications that require fast actuation, near-zero leakage, and low weight. An illustrative example addressed in the present disclosure is an ejection system for a crew compartment of an aeronautical craft. The ejection system must be designed to minimize the time between when the system is activated and when it propels the compartment away from the rest of the craft. As described further below, propulsion may include regulated release of a high-pressure gas. The valves of the regulator must be designed to open and close extremely fast in use, but also must seat precisely at each actuation and must not leak. The valves must contribute as little weight as possible to the ejection system, keeping down the overall weight of the crew compartment and the craft. The valves must also withstand the extreme conditions of the application, including extremely high fluid pressures (up to 10 kpsi or higher), extreme temperatures and temperature variation (from sub-zero to well above zero), material deformation due to pressure and thermal stresses, and vibrations and stresses due to high speeds of the craft. Finally, the valves must be compatible with the gases used in the system, such as gaseous Helium (GHe) and corrosive hypergolic propellants like nitrogen tetroxide (N2O4) and monomethylhydrazine (MMH). A balanced poppet valve capable of functioning in this application is needed.

BRIEF SUMMARY

The disclosure provides a solenoid-actuated pressure regulating valve having pressure-balanced dual poppets that rapidly open and close and are precisely seated for near-zero leakage. The valve is capable of application in an ejection system for a crew compartment of an aeronautical craft, and the disclosure further provides an ejection module that utilizes one or more of the valves.

In one aspect, a pressure regulator for controlling the flow of a pressurized fluid in accordance with this disclosure includes a housing having a proximal end, a distal end, and a plurality of chambers. The plurality of chambers connect one or more inlet channels to one or more outlet channels such that the pressurized fluid flows through the inlet channels into the chambers and out of the chambers through the outlet channels. The pressure regulator further includes a pressure-balanced valve assembly disposed within the housing. The valve assembly includes a first seat cartridge having a first seat, a first poppet positioned to close against the first seat to prevent the flow of the pressurized fluid through a first of the chambers, a second seat cartridge having a second seat, and a second poppet coaxial with the first poppet and positioned to close against the second seat to prevent the flow of the pressurized fluid through a second of the chambers. Each of the first and second poppets have a proximal end, a distal end, and a knife edge that projects from the distal end and contacts the respective seat to create a bubble-tight seal. The knife edge of the first poppet faces into the pressure of the pressurized fluid, and the knife edge of the second poppet faces away from the pressure of the pressurized fluid. The pressure regulator further includes a valve actuator configured to simultaneously open both seals between the poppets and the seats.

In another aspect, a pressure regulator in accordance with this disclosure includes a housing, a cover assembly attached to the housing, and a pressure-balanced dual poppet valve contained in the housing for controlling flow of a pressurized fluid. Each poppet of the valve has a knife edge that contacts a seat to create a bubble-tight seal, wherein one knife edge faces into the pressure of the fluid and the other knife edge faces away from the pressure of the fluid. The pressure regulator further includes a direct-acting solenoid contained in the cover assembly. The solenoid has a pushrod that engages one of the poppets of the valve. Energizing the solenoid simultaneously opens both seals between the poppets and the seats, and de-energizing the solenoid simultaneously closes both seals between the poppets and the seats.

These and other aspects and advantages of the disclosure will be apparent from the detailed description and drawings. What follows are one or more example embodiments. To assess the full scope of the invention the claims should be looked to, as the example embodiments are not intended as the only embodiments within the scope of the invention.

BRIEF DESCRIPTION OF THE DRAWINGS

FIG. 12 is a section view of the example embodiment taken along line 12-12 of FIG. 11; and FIG. 13 is a section view of the example embodiment taken along line 13-13 of FIG. 11.

DETAILED DESCRIPTION OF THE EXAMPLE EMBODIMENT(S)

A pressure regulator with a pressure-balanced valve having two coaxial poppets is configured to operate in the extreme environment of supersonic or hypersonic flight. The pressure regulator, however, is also suitable for operation at velocities below Mach 1, such as reached in conventional aircraft. Additionally, while the example embodiment is described in relation to an ejection system for a crew compartment of an aeronautical craft, the pressure regulator and its valve configuration may be used in any suitable application that requires high speed valve operation, zero or near-zero leakage, low weight, and low power consumption.

The example embodiment will be described with reference to a crew compartment ejection system for an aeronautical craft, in particular a manned spacecraft. Such ejection systems are intended to jettison and propel away a crew compartment, such as one or more manned capsules, a pressurized spaceplane cabin, or another crew compartment, from the rest of the spacecraft in a launch abort situation on the launch pad, during ascent, or during re-entry. In each situation the effects of gravity, pressure, wind resistance, and spacecraft velocity dictate that the ejection system generate a considerable amount of thrust. Furthermore, the impending threat of explosion or other calamity dictates that the ejection system activates its propulsion as quickly as possible after the system is initiated. The pressure regulator may be used to pressurize the propellant tanks of the ejection system as described below, and therefore is capable of operation in extreme environments associated with high velocity and high altitude travel, minimizes cost and weight, and improves efficiency and dependability over previous solutions.

Figure 1:
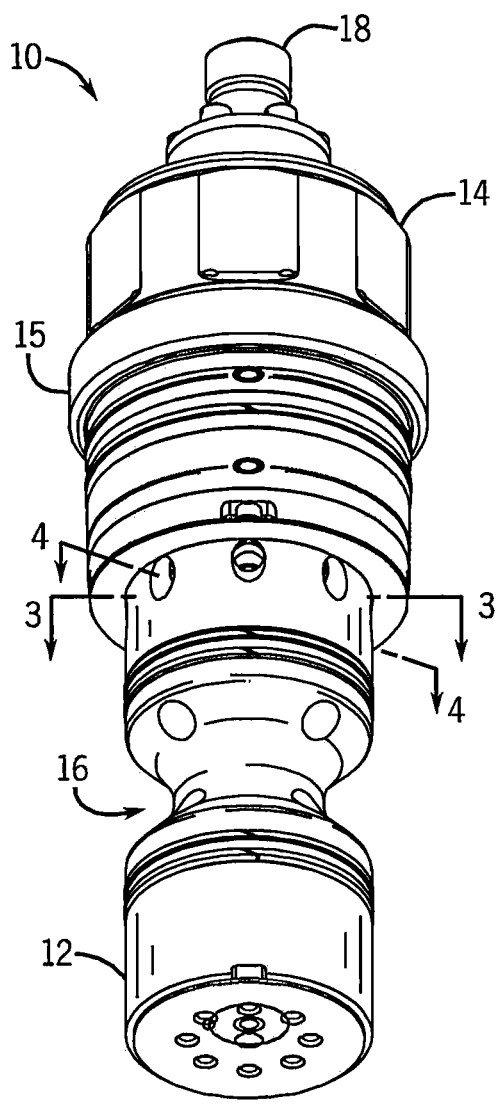
FIG. 1 is a perspective view of a pressure regulator in accordance with an exemplary embodiment.
Figure 2:
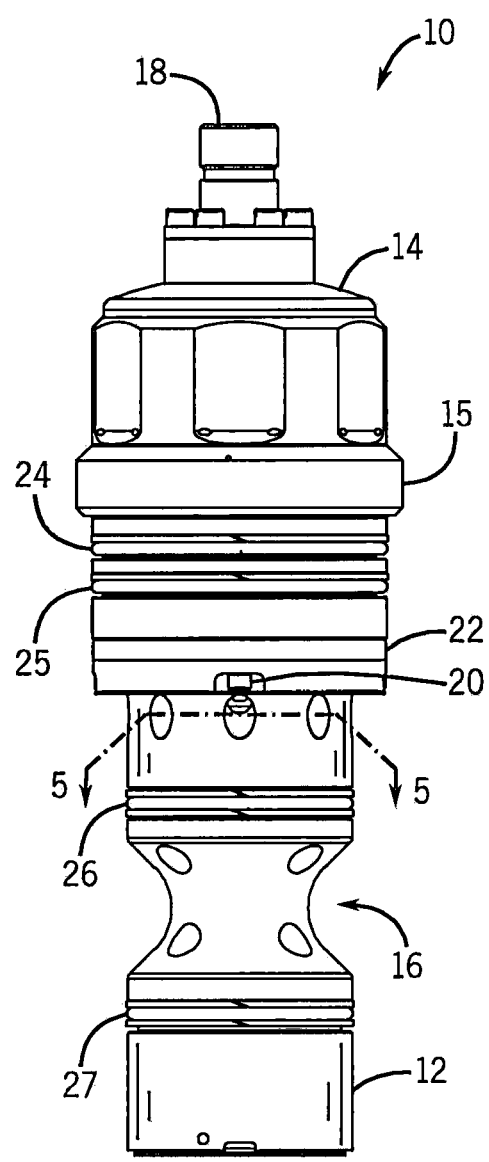
FIG. 2 is a side view of the example embodiment.
Figure 8:
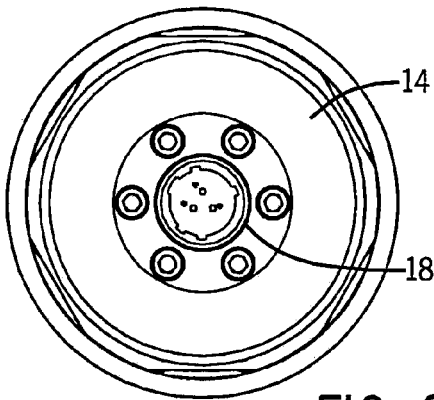
FIG. 8 is a top view of the exemplary embodiment.

Looking first to FIGS. 1-2, a pressure regulator 10 in accordance with an example embodiment of the present invention is shown. The regulator 10 may be configured for insertion into a pressure regulator assembly, such as a manifold, starting at the proximal end of the regulator 10. The regulator 10 includes a housing 12 attached at its distal end to the proximal end of a cover assembly 14. The housing 12 contains the valve assembly described below. The housing 12 may be substantially cylindrical, and may include a concave section 16 extending partially or fully around the circumference of the housing 12. The concave section 16 may create a mixing chamber for pressurized fluid when the regulator 10 is inserted into a pressure regulator assembly, as described further below. The cover assembly 14 contains the solenoid and solenoid chamber described below. The cover assembly 14 may include a coupling 18 that interfaces with a power supply assembly (not shown) to receive electrical attachments for the wires that power the solenoid (also see FIG. 8). The cover assembly 14 may further include a threaded portion 15 on its exterior surface. The threaded portion 15 mates with cooperating threads on the pressure regulator assembly to install the regulator 10. The cover assembly 14 may be attached to the housing 12 using a plurality of cap screws 20. A flange 22 may be used to space the housing 12 away from the cover assembly 14, and may provide additional functionality as described below. One or more sealing mechanisms, such as o-rings 24-27, may be seated against or within recesses of the exterior surfaces of the housing 12 and cover assembly 14 to provide bubble-tight seals against the pressure regulator assembly when the regulator 10 is installed.

Figure 3:
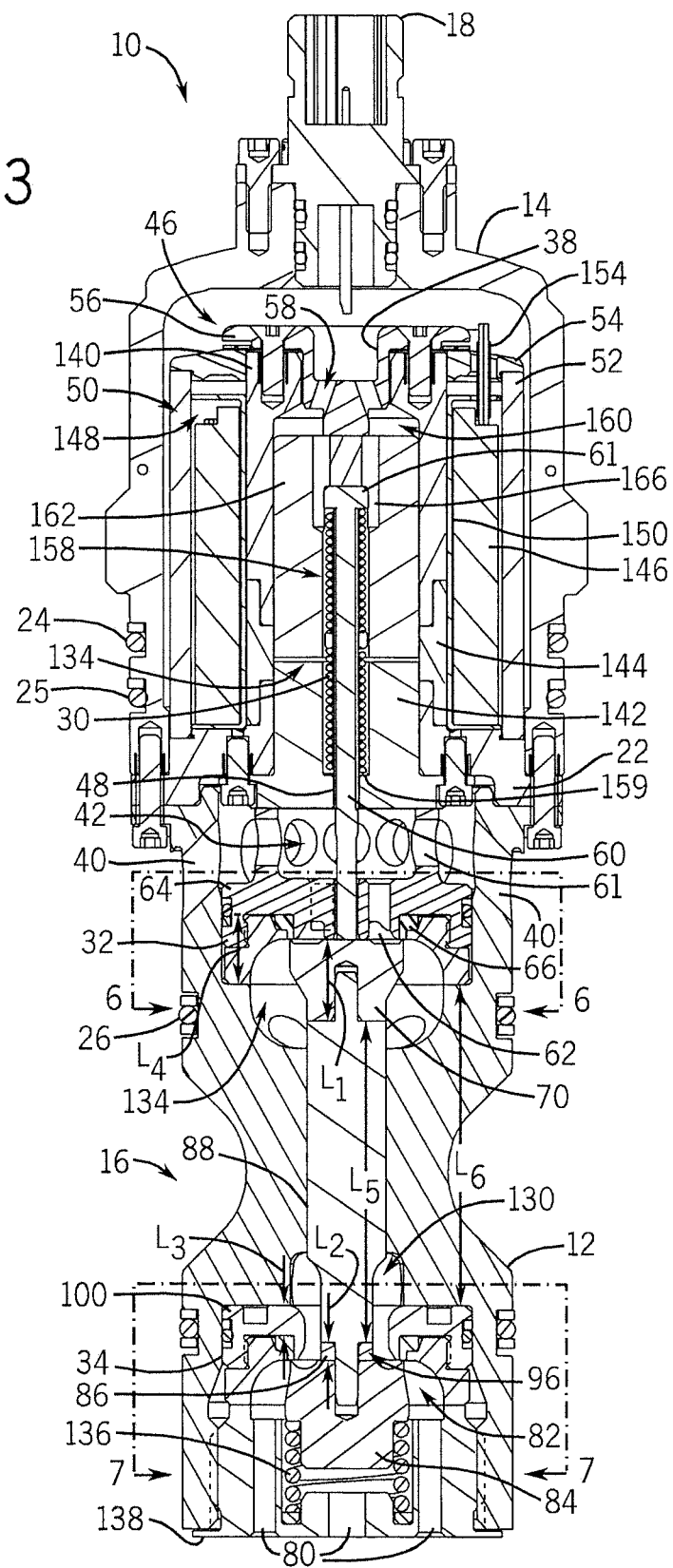
FIG. 3 is a section view of the example embodiment taken along line 3-3 of FIG. 1.
Figure 4:
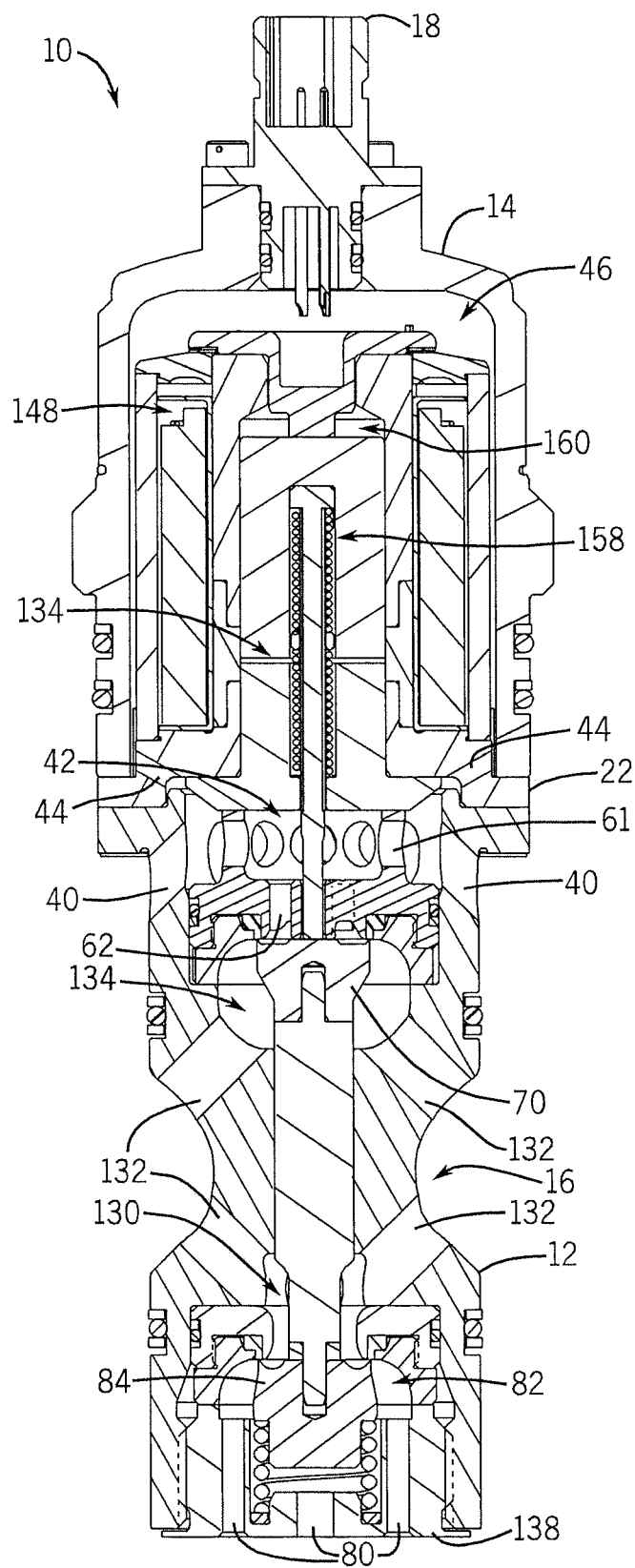
FIG. 4 is a section view of the example embodiment taken along line 4-4 of FIG. 1.
Figure 5:
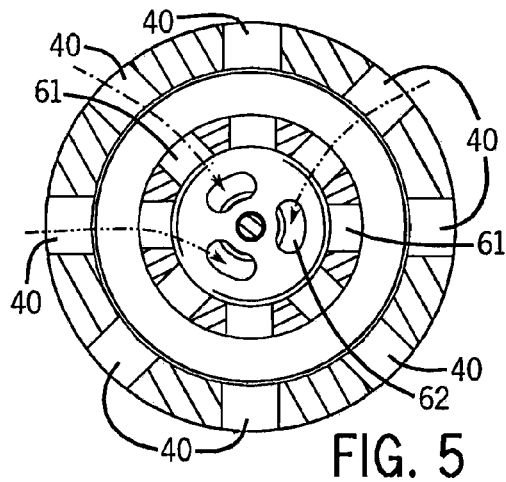
FIG. 5 is a section view of the example embodiment taken along line 5-5 of FIG. 2.

Referring to FIGS. 3-5, the housing 12 encloses the pressure-balanced two-poppet valve assembly. The valve assembly includes a distal poppet 70 attached to a proximal poppet 84 by a pin 88, a seat cartridge 32, 34 for each poppet 70, 84, and a poppet spring 136 that biases the poppets 70, 84 closed against their respective seats 66, 86. The distal poppet 70 and proximal poppet 84 are identically sized and coaxially mounted with the pin 88, all of which are coaxial with the housing 12 and solenoid 50. The poppets 70, 84 and pin 88 may be any suitable material that is corrosion resistant and compatible with the pressurizing fluid and propellants. One suitable material for the poppets 70, 84 is stainless steel. One suitable material for the pin 88 is tempered aluminum. Aluminum, rather than steel, may be more useful for a pin 88 material to allow the pin 88 to deform longitudinally as described further below. The pin 88 may be anodized to increase its corrosion resistance. A proximal poppet spacer 96 may be positioned between the pin 88 and the proximal poppet 84. The proximal poppet spacer 96 is the same material as the proximal poppet 84 and accounts for deformation of the pin 88 and housing 12.

Figure 7:
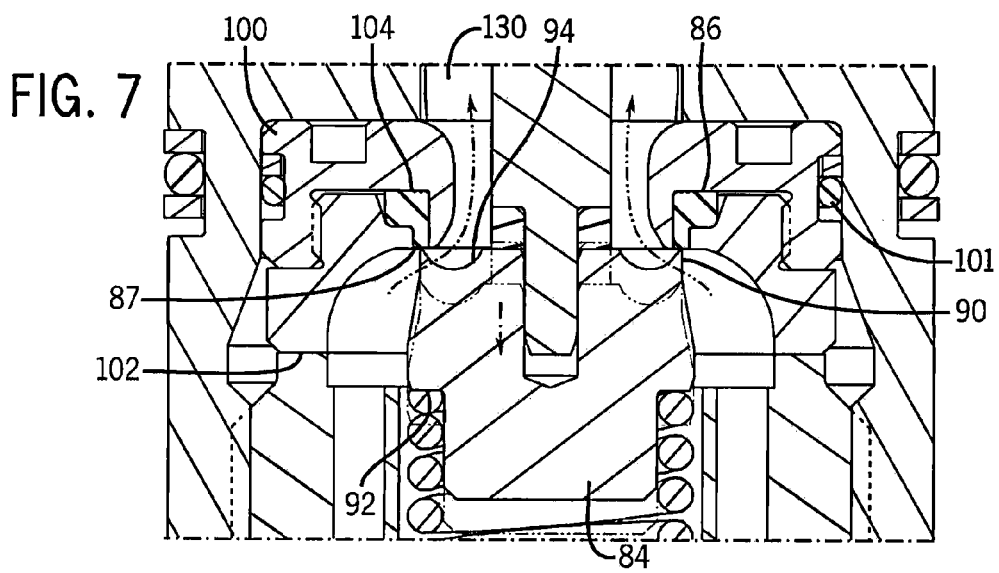
FIG. 7 is a close-up section view of a portion of the example embodiment taken along line 7-7 of FIG. 3 and showing the distal poppet motion and fluid flow.
Figure 9:
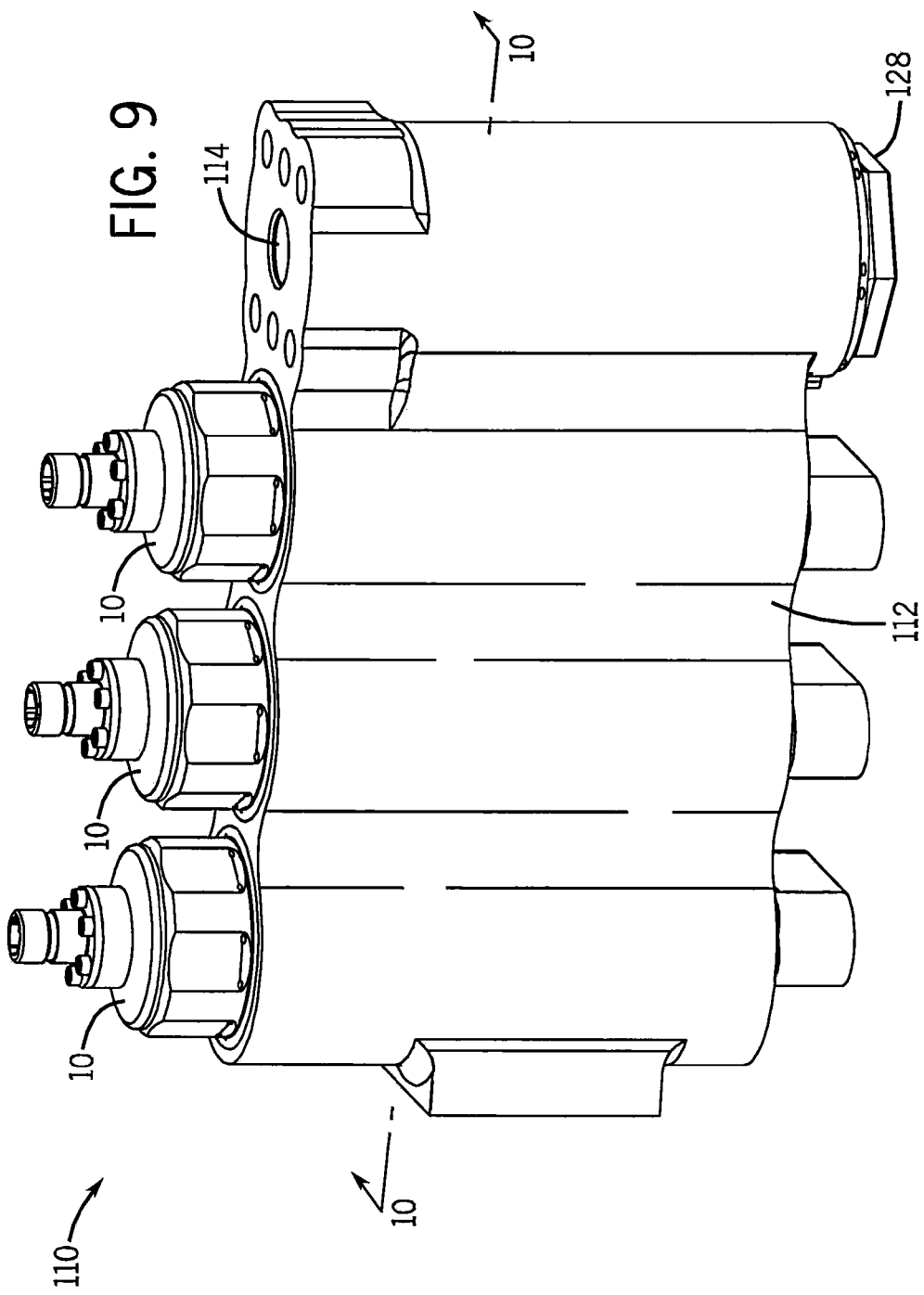
FIG. 9 is a perspective view showing a manifold in accordance with an exemplary embodiment.
Figure 10:
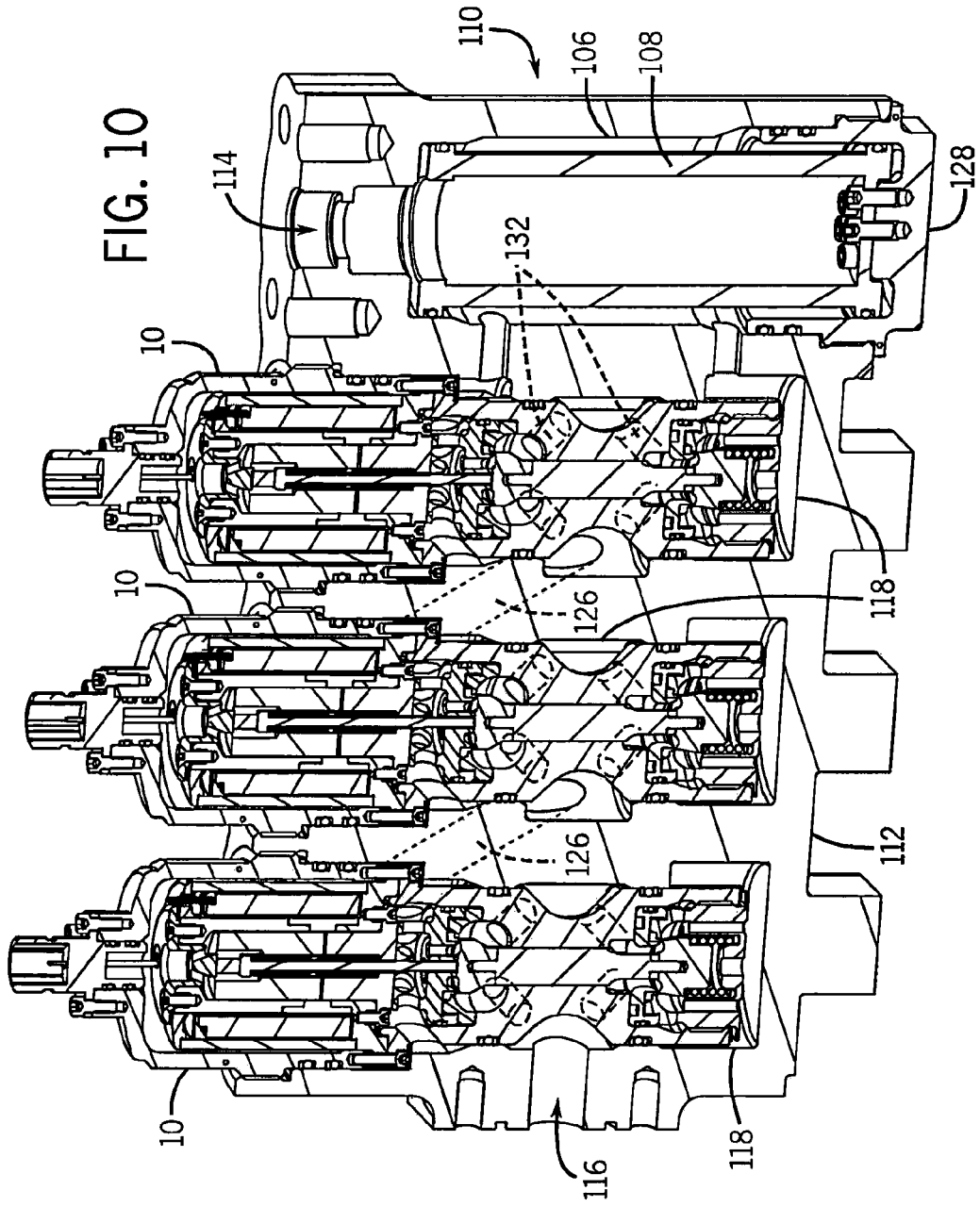
FIG. 10 is a perspective section view of the example embodiment taken along line 10-10 of FIG. 9.
Figure 11:
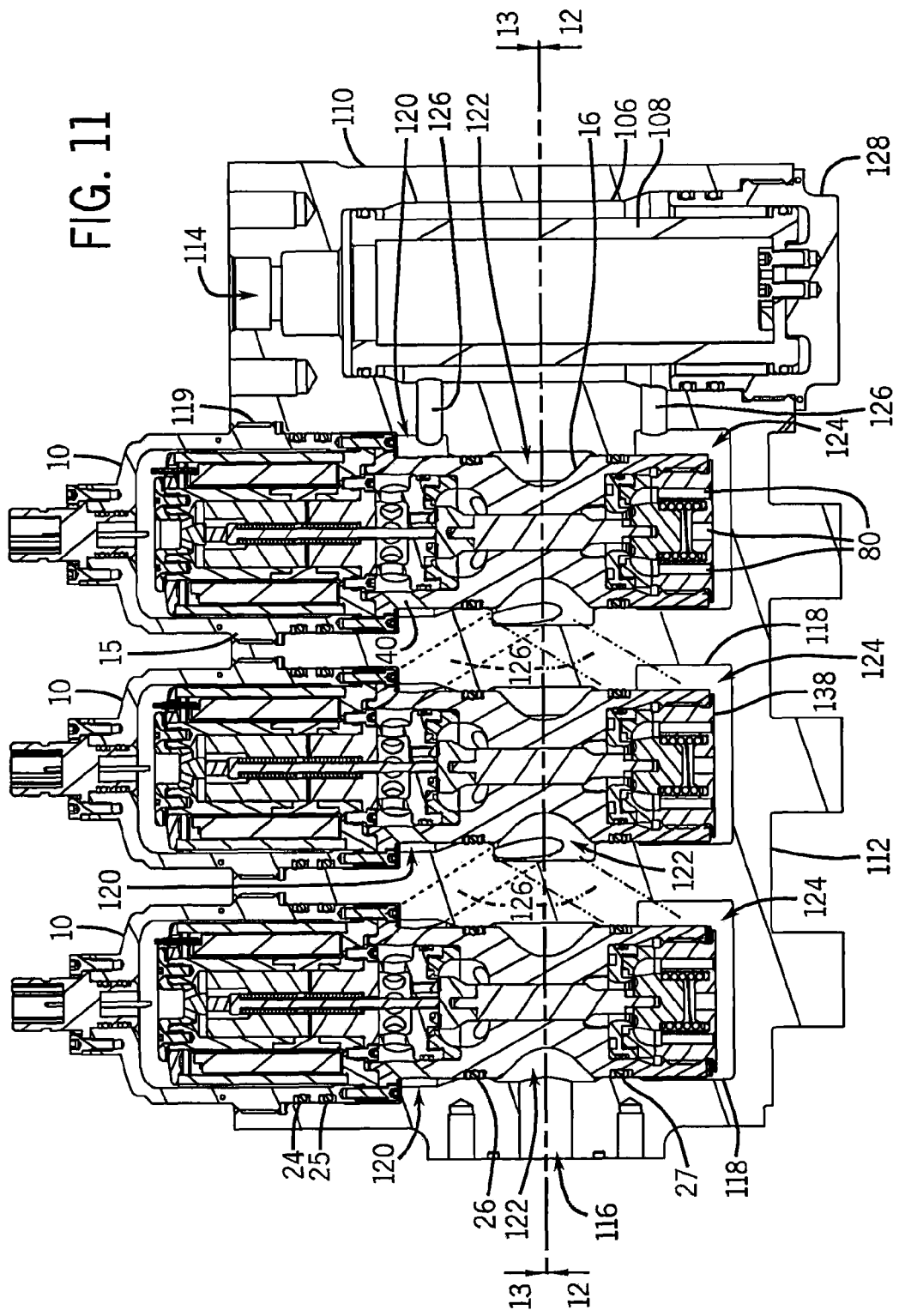
FIG. 11 is a side view of the section of FIG. 10.

Referring to FIG. 7, the proximal poppet 84 contacts the proximal seat 86 at a knife edge 90 that projects from the distal end of the proximal poppet 84. A knife edge 90 is a ring of poppet material that tapers down to a minimum width that allows the knife edge to "sink into" the proximal seat 86 and form a bubble-tight seal. The minimum width of the knife edge 90 may be about 0.002 inches. The depth to which the knife edge 90 sinks into the proximal seat 86 is dependent on the minimum knife edge width and on the seat 86 material hardness.

Figure 6:
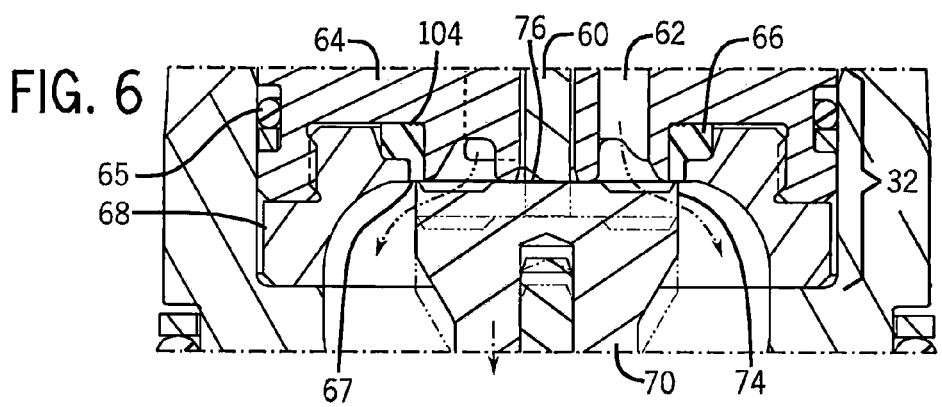
FIG. 6 is a close-up section view of a portion of the example embodiment taken along line 6-6 of FIG. 3 and showing the proximal poppet motion and fluid flow.

When the valve is closed and pressure-balanced, the surface of the proximal poppet 84 that extends proximally from the knife edge 90 and has a bold line in FIG. 6, referred to as the proximal surface 92, is contacted and placed under pressure by the pressurized fluid. The knife edge 90 therefore faces away from the pressure. When the valve opens, the fluid flows through the gap between the knife edge 90 and the proximal seat 86 "inwardly" across the knife edge 90 into the pin chamber 130, contacting the distal surface 94 of the proximal poppet 84. The distal surface 94 may be scalloped or otherwise concave, in contrast to a substantially planar distal surface. The concavity of the distal surface 94 allows the flow of fluid through the gap between the knife edge 90 and the seat 86 to expand, reducing the force of the fluid pushing in the proximal direction on the distal surface 94. This helps to minimize imbalance between forces at the poppets 70, 84 during flow of the fluid.

The seat cartridge 34 for the proximal seat 86 includes the proximal seat 86 retained in place by a proximal seat holder 100 and a proximal seat retainer 102. The proximal seat holder 100 is a substantially annular steel member that holds the proximal seat 86 along the distal end and inner surface of the proximal seat 86. The proximal seat holder 100 fits into a recess in the housing 12 and may retain one or more o-rings 101 for creating a bubble-tight seal against the housing 12 to prevent any fluid leakage between the parts. The proximal seat holder 100 may include at least one tooth 104 projecting from the surface of the proximal seat holder 100 that contacts the distal end of the proximal seat 86. The tooth 104 forms a seal with the proximal seat 86 so fluid cannot pass completely between the proximal seat 86 and the proximal seat holder 100. The tooth 104 is positioned at the same distance from the regulator 10 axis as the knife edge 90, so that the tooth 104 and knife edge 90 are approximately axially aligned to best seal against the proximal seat 86 on both ends.

The proximal seat holder 100 may have a threaded portion that mates with a threaded portion of the proximal seat retainer 102. The proximal seat retainer 102 extends over and presses down upon a portion of the proximal seat 86 to retain the proximal seat 86 in place. A poppet-contacting portion 87 of the proximal seat 86 extends to an approximately proximally flush position with respect to the proximal seat holder 100 and proximal seat retainer 102, as illustrated. The portion 87 receives the knife edge 90 of the proximal poppet 84 when the valve is closed.

Referring to FIG. 6, the distal poppet 70 is configured with a knife edge 74 similar in configuration and function to the knife edge 90 of the proximal poppet 84. The knife edge 74 seals against the distal seat 66. However, when the valve is closed and pressure-balanced, the surface of the distal poppet 70 that covers the distal end within the knife edge 74 and has a bold line in FIG. 7, referred to as the distal surface 76, is contacted and placed under pressure by the pressurized fluid. It should be noted that a small gap (not shown due to required line widths in the drawings) of about 0.003 inches may be left between the distal surface 76 and the pushrod 60 when the valve is closed, to prevent accidental actuation of the valve. The knife edge 74 therefore faces into the fluid pressure. When the valve opens, the fluid flows through the gap between the knife edge 74 and the distal seat 66 "outwardly" across the knife edge 74 and away from the distal poppet 70 into the distal poppet chamber 134.

The seat cartridge 32 for the distal seat 66 includes the distal seat 66 retained in place by a distal seat holder 64 and a distal seat retainer 68. The distal seat holder 64 is a substantially annular steel member that holds the distal seat 66 along the distal end and inner surface of the distal seat 66. The distal seat holder 64 fits into a recess in the housing 12 and may retain one or more o-rings 65 for creating a bubble-tight seal against the housing 12 to prevent any fluid leakage between the parts. The distal seat holder 64 may include at least one tooth 104 projecting from the surface of the distal seat holder 64 that contacts the distal end of the distal seat 66. The tooth 104 forms a seal with the distal seat 66 so fluid cannot pass completely between the distal seat 66 and the proximal seat holder 64. The tooth 104 is positioned at the same distance from the regulator 10 axis as the knife edge 74, so that the tooth 104 and knife edge 74 are approximately axially aligned to best seal against the distal seat 66 on both ends. The distal seat holder 64 may have a chamber 42 and one or more apertures 61, 62 disposed through the distal seat holder 64 into the chamber 42 for conveying fluid through the distal seat holder 64 as described below. See FIG. 5.

The distal seat holder 64 may have a threaded portion that mates with a threaded portion of the distal seat retainer 68. The distal seat retainer 68 extends over and presses down upon a portion of the distal seat 66 to retain the distal seat 66 in place. A poppet-contacting portion 67 of the distal seat 66 extends to an approximately proximally flush position with respect to the distal seat holder 64 and distal seat retainer 68, as illustrated. The portion 67 receives the knife edge 74 of the distal poppet 70 when the valve is closed.

The seats 66, 86 are annular members made of an at least partially deformable polymer that is compatible with the gas used in the regulator 10, and may further be compatible with any propellants used in associated systems. The polymer may be a plastic, particularly a thermoplastic. The polymer may be a polytetrafluoroethylene (PTFE) material, such as TEFLON by DuPont Co. The PTFE may have a very high purity, up to 100% or "virgin grade." However, while virgin PTFE has improved chemical and thermal resistance properties over "mechanical grade" PTFE, which may contain additives, virgin PTFE has a tendency to cold-flow. In a critical application where virgin PTFE is preferred, the above-described seat cartridges 32, 34 serve to keep the cold-flowing material in place. The polymer may alternatively be a polychlorotrifluoroethylene (PCTFE) material, which exhibits less creep than PTFE but is also stiffer. The seat 66, 86 material must be pliant enough to allow the corresponding knife edges 74, 90 and teeth 104 to sink into the seat 66, 86 and create the necessary bubble-tight seal.

With reference to FIGS. 6 and 7, the dimensions of the valve components —including the pin 88, proximal poppet spacer 96, poppets 70, 84, knife edges 74, 90, seat holders 64, 100, seat retainers 68, 102, and seats 66, 86—are selected so that the knife edges 74, 90 contact and release from the seals 66, 86 at precisely the same time during valve operation. Maintenance of certain dimensional ratios facilitates this goal. The area of each surface 76, 92 of the poppets 70, 84 that is contacted by the pressurized fluid in the pressure-balanced state should be equivalent (i.e. a 1:1 ratio). This equivalence creates the pressure balance; that is, the same area on each poppet 70, 84 is subjected to the same fluid pressure. The fluid pressure imparts a net force on each poppet 70, 84, but in opposite directions, canceling out the forces. As a result, the valve can be held closed and actuated with minimal force.

To maintain the desired valve action under thermal or pressure deformation, the part lengths identified in FIG. 4 are related as follows. $L_1+L_2=L_3+L_4$: the length $L_1$ of the distal poppet 70 measured from the proximal end to the distal end, plus the length $L_2$ of the proximal poppet spacer 96 from its proximal to distal end, is equal to the length $L_3$ of the proximal seat holder 100 measured from its distal end to the surface that contacts the distal end of the proximal seal 86, plus the length $L_4$ of the distal seat retainer 68 from its proximal end to its distal end (which is coplanar with the distal end of the distal seat 66). Further, the length $L_5$ of the pin 88 from its point of contact with the proximal poppet spacer 96 to its point of contact with the proximal end of the distal poppet 70, is equal to the length $L_6$ of the housing 12 from the bottom of the cavity that retains the proximal seat cartridge 34 to the top of the cavity that retains the distal seat cartridge 32. In the latter case, if the housing 12 and pin 88 are made of the same tempered aluminum, they will undergo the same thermal and pressure deformation.

The pressure-balanced valve assembly may be held closed by a poppet spring 136 biased between the proximal poppet 84 and a spring retainer 138. The poppet spring 136 may be a light load spring because little force is required to hold the valve closed. The poppet spring 136 distributes an equally-divided load on the knife edges 74, 90 to drive the knife edges 74, 90 into their respective seats 66, 86 to a depth that is sufficient to provide bubble tight sealing. To protect the seals 66, 86 from damage under unexpected high load, the deformation depth of the knife edges 74, 90 may be limited by the position of one or both poppets 70, 84. One or both poppets 70, 84 may contact their respective seat holders 64, 100 at a desired maximum depth of the knife edges 74, 90. At the opposite end of the valve assembly, a pushrod 60 of a solenoid 50 engages the distal end of the distal poppet 70 to open the valve.

The spring retainer 138 may be threadedly mated with the housing 12, and may be aluminum or another corrosion-resistant material. The spring retainer 138 may have one or more inlet channels 80 extending from the outer surface of the spring retainer 138 into a chamber 82 around the proximal poppet 84. The proximal poppet chamber 82 may be in fluid communication with a pin chamber 130 disposed within the housing, distal to the proximal poppet 84 and surrounding the pin 88. The pin chamber 130 in turn may be in fluid communication with one or more outlet channels 132 disposed through the housing 12 to the exterior of the housing 12 at the concave section 16. The housing 12 may also have one or more inlet channels 40. The inlet channels 40 may extend from the surface of the housing 12 into the cavity containing the distal seat cartridge 32. In particular, the inlet channels 40 may be in fluid communication with the chamber 42 of the distal seat holder 64, through the apertures 61. The housing 12 may further contain a distal poppet chamber 134 that extends into the cavity containing the distal seal cartridge 32, wherein the distal seat holder 64 and distal seat retainer 68 form part of the distal poppet chamber 134. The distal poppet chamber 134 may be in fluid communication with the chamber 42 through the apertures 62. Additional outlet channels 132 may connect the distal poppet chamber 134 with the exterior of the housing 12 at the concave section 16.

The cover assembly 14 may be slightly wider and longer than the solenoid 50 it contains. This leaves a solenoid chamber 46 having fluid-tight space between the inner surface of the cover assembly 14 and the side and distal end of the solenoid 50. The solenoid has a shell 52 attached to the flange 22 and a cap 54 attached to the shell 52. The shell 52 and cap 54 form the side and distal end of the solenoid 50 and are compatible with the contained gas. The shell 52 and cap 54 may be made of iron, steel, or another suitable material.

The solenoid 50 may be any suitable normally-closed solenoid 50 for directly actuating the valve by extending the pushrod 60 into contact with the distal poppet 70 and opening a gap between the knife edges 74, 90 and their respective seals 66, 86. An exemplary solenoid is described herein with reference to the figures. The flange 22 may be a solenoid-quality stainless steel alloy. The flange 22 retains the solenoid in place via its attachment to the solenoid pole pieces 140, 142. In particular, a reluctor 144 may be attached, such as by welding or brazing, to and extend distally from the flange 22, and an upper pole piece 140 may be attached, such as by welding or brazing, to and extend distally from the reluctor 144. A gap plate 56 may then be bolted or otherwise attached to the upper pole piece 140 over the cap 54 to close the distal end of the solenoid 50, while a lower pole piece 142 may be bolted or otherwise attached to the flange 22 to close the proximal end of the solenoid 50. The reluctor 144 may be a non-magnetic alloy, such as a primarily cobalt alloy. The pole pieces 140, 142 may be a metal with high magnetic permeability, such as electrical iron. The gap plate 56 may be a non-magnetic metal, such as austenitic stainless steel. The lower pole piece 142 may be a metal with high magnetic permeability, such as electrical iron.

The flange 22, reluctor 144, and upper pole 140 may together form a core tube that separates the interior of the solenoid 50 into two chambers. One of the chambers, formed between the cylinder and the shell 52, contains the solenoid coil 146 and is therefore referred to as the coil chamber 148. The coil 146 may be a typical coil of copper or other conductive wire. The coil 146 may be wound around a bobbin 150. The coil chamber 148 may be in fluid communication with the solenoid chamber 46 via an aperture 152 through the cap 54. The bobbin 150 may seal off the coil 146 from the part of the coil chamber 148 that is in fluid communication with the solenoid chamber 46. A fluid-impermeable conduit 154 may be disposed through the aperture 152 and through the bobbin 150. The conduit 154 may shield one or more wires (not shown) that are connected to the coil 146 to energize the solenoid from a power source (not shown). Alternatively, the bobbin 150 may not seal off the coil 146, and the coil may be insulated from any fluid contact with a sealant, such as room-temperature vulcanizing silicone adhesive sealant.

The chamber inside the core tube, referred to as the core chamber 160, may contain an armature 162 and portions of the gap plate 56, lower pole piece 142, and pushrod 60 that interact with the armature 162. The core chamber 160 may be in fluid communication with the solenoid chamber 46 via one or more plate channels 58 disposed through the gap plate 56. The gap plate 56 may extend proximally into the core chamber 160, while the lower pole piece 142 may extend distally into the core chamber 160. The armature 162 may have a diameter equal to the diameter of the core chamber 160, and therefore abuts the upper pole piece 140 and the reluctor 144. The armature 162 also abuts the gap plate 56, which is sized so that the armature 162 is separated from the lower pole piece 142 by an actuation gap 164 when the armature 162 is contacting the gap plate 56. The armature 162 may be a metal with high magnetic permeability, such as electrical iron, and advantageously is the same metal as the pole pieces 140, 142. The components within the core chamber 160 are arranged so that the actuation gap 164 is aligned laterally with the reluctor 144.

An axial chamber 158 may be disposed along the regulator's 10 axis, beginning within the armature 162 and extending proximally out of the proximal end of the armature 162, across the actuation gap 164, and completely through the lower pole piece 142. The axial chamber 158 may be in fluid communication with the core chamber 160 via the actuation gap 164, and further via one or more armature channels 166 disposed through the armature 162. The axial chamber 158 may retain the pushrod 60, the proximal end of which abuts the armature 162 at the base of the axial chamber 158. A pushrod spring 30 may be slightly compressed in the axial chamber 158 between a head 61 of the pushrod 60 and a shoulder 159 of the axial chamber 158 that reduces the width of the axial chamber 158 as it approaches the proximal end of the lower pole piece 142. The pushrod spring 30 may bias the head 61 of the pushrod against the armature 162 when the solenoid 50 is de-energized. The spring load may be minimal, typically about seven to eight lbs. or sufficient to keep the armature 162 stationary while the solenoid 50 is de-energized. A portion of the pushrod 60 may be sheathed by a polymer sleeve 48. The sleeve 48 may serve as a fluid-impermeable gasket between the pushrod 60 and the narrow portion of the axial chamber 158.

The pushrod 60 thus extends out of the axial chamber 158, through the distal seat holder chamber 42, and through the distal seat holder 64 to abut or come within a small distance from the distal poppet 70. When the solenoid 50 is energized, the magnetic field generated therein moves the armature 162 proximally until it abuts the lower pole piece 142, eliminating the actuation gap 164. Movement of the armature 162 therefore moves the distal poppet 70 and the pushrod 60 a distance approximately equal to the width of actuation gap 134, thus allowing fluid to flow thru both the distal poppet 70 and the proximal poppet 84. When the solenoid 50 is de-energized, the poppet spring 136 forces the valve closed. The pushrod spring 30 may force the pushrod 60 and armature 162 back an additional small distance to leave the gap between the pushrod 60 and the distal poppet 70.

The internal components and functionality of the regulator 10 may be further described with respect to the flow path of the pressurized fluid through the regulator 10. The inlet channels 40, 80 receive the fluid under pressure from a fluid source. Fluid flows through the inlet channels 40 of the housing 12 into the distal seat holder chamber 42 through the apertures 61, and then flows up against the distal poppet 70 through the apertures 62. Further, fluid flows out of the distal end of the housing 12 through one or more flange channels 44 in fluid communication with the housing 12. The fluid passes through the flange channels 44 into the solenoid chamber 46. The fluid flows across the distal end of the solenoid 50 into a wire recess 38 in the gap plate 56, through the plate channels 58 into the core chamber 160, and through the armature channels 166 and actuation gap 164 into the axial chamber 158. Closure of the distal poppet 70 against the distal seat 66 pressurizes the distal inlet channels 40, distal chamber 42, flange channels 44, solenoid chamber 46, plate channels 54, and axial chamber 58. In this manner, the fluid flows around and pressurizes the solenoid 50 when the valve is closed. The solenoid 50 therefore is substantially immersed and operates within the fluid, which allows for the use of high-permeability, low structural strength material to be used in the solenoid 50 because the solenoid 50 does not have to withstand the fluid pressure. The solenoid 50 may therefore be significantly lighter than a comparable solenoid that does not operate within the fluid.

Simultaneously, the fluid passes through inlet channels 80 in the spring retainer 138 into the proximal poppet chamber 82. The fluid pressurizes the proximal inlet channels and the proximal poppet chamber 82 when the valve is closed. When the valve is actuated, both poppets 70, 84 simultaneously open gaps between their knife edges 74, 90 and seats 66, 86. The pressurized fluid flows past the distal poppet 70 into the distal poppet chamber 134, and past the proximal poppet 84 into the pin chamber 130. The fluid then flows out of both chambers 130, 134 through outlet channels 132 and escapes to the exterior of the housing 12. The valve can be held open by continuously applying electricity to the solenoid 50. The valve can also be pulsed by energizing and de-energizing the solenoid 50 repeatedly. The design of the regulator 10 provides for the valve to be pulsed rapidly to control the volume and pressure of the outlet fluid. A transducer (not shown in Figs.) may increase or decrease the pulse rate of any pulsed regulator 10 in order to increase or decrease the volume or pressure of the fluid delivered to the output port 116.

The described regulator 10 is therefore a pressurized fluid, direct-drive, balanced dual poppet design that requires no dynamic seals and is pressure balanced. The sealing knife edge of one poppet faces into the pressure, and the sealing knife edge of the other poppet faces away from the pressure. In this manner, the design achieves an almost perfect pressure balance (within manufacturing tolerances), so that high or low fluid pressure has essentially zero effect on performance. This will allow a common solenoid for a large range of flows, on the order of near-zero to 10,000 psi. The solenoid forces can be optimized for light weight, high speed response, and low power consumption. Furthermore, the design provides for a controlled depth of deformation by the sealing knife edges of the poppets into the "soft" surfaces of the seats. With this arrangement, no dynamic seals are required, reducing the friction to a very low value. Both metering and shut-off sealing is accomplished by the static seal at the seats, which are capable of achieving bubble-tight shut-off.

Referring now to FIGS. 9-13, a manifold 110 for an ejection system utilizes one or more regulators 10 to deliver high-pressure GHe from a fluid source (not shown) to one or more propellant tanks (not shown). In an example system, the manifold 110 is attached to two propellant tanks that contain hypergolic propellants, such as N2O4 and MMH. The hypergolic propellants ignite when they come in contact with each other. The GHe is delivered at high pressure to pressurize the propellant tanks and force the propellant out of the tanks at a desired rate.

The exemplary manifold 110 includes three regulators 10, wherein one of the regulators 10 pulses the release of GHe to an output port 116 (see FIG. 10) and the other two regulators 10 are redundant emergency shutoff valves. Any one of the three regulators 10 may be the pulsing regulator 10. Further, it will be understood that a manifold 110 can perform the regulated GHe delivery with a single regulator 10, or with two regulators 10—one to pulse and one as a shutoff valve. The exemplary design is useful in space applications, where multiple redundancies are usually required to protect astronauts and payloads.

The manifold 110 may receive the regulators 10 in a cartridge-style installation procedure. A manifold body 112 includes a socket 118 for each regulator 10. The socket 118 has a threaded portion 119 at its distal end which mates with the threaded portion 15 of the cover assembly 14 to hold the regulator 10 in place. The o-rings 24-27 of the socket contact the surface of the socket 118 to create a bubble-tight seal at particular locations in the socket 118. In particular, two o-rings 24, 25 prevent fluid escape from a distal inlet chamber 120 out of the distal end of the socket 118, a third o-ring 26 creates a seal between the distal inlet chamber 120 and an outlet chamber 122, and a fourth o-ring 27 creates a seal between the outlet chamber 122 and a proximal inlet chamber 124. The distal inlet chamber 120 of each socket 118 may be a cylindrical hollow area that encircles the portion of the regulator 10 housing 12 where the inlet channels 40 meet the housing's 12 exterior surface. The proximal inlet chamber 124 may be a hollow area that encompasses the proximal end of the regulator 10, including the inlet channels 80 of the spring retainer 138. The outlet chamber 122 may be a cylindrical hollow area that encircles the concave section 16 of the housing 12.

The manifold body 112 may include an inlet port 114 in fluid communication with the fluid source. A filter socket 106 for a filter 108 may be provided downstream (i.e. in the direction of the fluid flow) of the inlet port 114. The filter 108 may remove any particulates from the incoming fluid. A suitable filter 108 may have a pore size of about 10 microns nominal and 25 microns absolute. A filter cap 128 may be threadedly attached to the body 112 to cover the proximal end of the filter socket 106. One or more manifold channels 126 may extend between the filter socket 106 and each of the inlet chambers 120, 124 of the first socket 118 downstream from the filter socket 106. One or more manifold channels 126 may extend from the outlet chamber 122 of each socket 118 to the inlet chambers 120, 124 of the downstream adjacent socket 118. The outlet chamber 122 of the final socket 118 may be in fluid communication with the output port 116, which may be in fluid communication with the propellant tanks. In operation, the pressurized fluid (i.e., GHe) flows from the inlet port 114 through the filter 108 and filter socket 106, and through the manifold channels 126 to the inlet chambers 120, 124 of the first socket 118. The fluid flows into the regulator 10 through the inlet channels 40, 80 as described above. If the valve of the regulator 10 in the first socket 118 is closed, the fluid pressurizes the regulator 10 (as described above), the inlet chambers 120, 124, the manifold channels 126 between the inlet chambers 120, 124 and the filter chamber 106, and the filter chamber 106 itself. If the valve of the regulator 10 is open, the fluid proceeds to flow into the outlet chamber 122, through the manifold channels 126 to the inlet chambers 120, 124 of the downstream adjacent socket 118, and so on as described until the last outlet chamber 122 is reached, where the fluid flows out of the output port 116.

It should be appreciated that merely example embodiments of the have been described above. However, many modifications and variations to the example embodiments will be apparent to those skilled in the art, which will be within the spirit and scope of the invention. Therefore, the invention should not be limited to the described embodiments. To ascertain the full scope of the invention, the following claims should be referenced.

What is claimed is:

1. A pressure regulator for controlling the flow of a pressurized fluid, the pressure regulator comprising:
   a housing having a proximal end, a distal end, and a plurality of chambers connecting at least one inlet channel to at least one out channel such that the pressurized fluid flows through the at least one inlet channel into the chambers and out of the chambers through the at least one outlet channel;
   a pressure-balanced valve assembly disposed within the housing, the valve assembly comprising:
      a first seat cartridge comprising a first seat;
      a first poppet positioned to close against the first seat to prevent the flow of the pressurized fluid through a first of the chambers;
      a second seat cartridge comprising a second seat;
      a second poppet coaxial with the first poppet and positioned to close against the second seat to prevent the flow of the pressurized fluid through a second of the chambers;
      each of the first and second poppets having a proximal end, a distal end, and a knife edge that projects from the distal end and contacts the respective seat to create a bubble-tight seal, the knife edge of the first poppet facing into the pressure of the pressurized fluid and the knife edge of the second poppet facing away from the pressure of the pressurized fluid; and
      a valve actuator configured to simultaneously open both seals between the poppets and the seats;
   wherein the valve assembly is positioned so that when the seals between the poppets and the seats are closed, the pressurized fluid contacts and places under pressure a distal surface on the distal end of the first poppet, and a proximal surface on the proximal end of the second poppet, the force of the pressure on the distal surface of the first poppet being equal to the force of the pressure on the proximal surface of the second poppet; and
   wherein when the seals between the poppets and the seats are opened, the pressurized fluid flows outwardly across the knife edge of the first poppet into the first chamber; and inwardly across the knife edge of the second poppet into the second chamber.

2. The pressure regulator of claim 1, wherein the first and second seats comprise a deformable polymer that is compatible with the pressurized fluid.

3. The pressure regulator of claim 2, wherein the first and second poppets comprise stainless steel.

4. The pressure regulator of claim 3, wherein the knife edge of each of the first and second poppets deforms the respective seat to a controlled depth to create the bubble-tight seal.

5. The pressure regulator of claim 1, wherein a distal surface on the distal end of the second poppet is scalloped.

6. The pressure regulator of claim 1, wherein the housing comprises a concave section, and wherein when the seals between the poppets and the seats are opened, the pressurized fluid flows from the first and second chambers through the at least one outlet channel to the exterior of the housing at the concave portion.

7. The pressure regulator of claim 1, further comprising a spring retainer attached to and covering the proximal end of the housing, the spring retainer comprising one or more of the at least one inlet channel.

8. The pressure regulator of claim 7, wherein the valve assembly further comprises a poppet spring that abuts the spring retainer and the second poppet and biases the first and second poppets closed against the first and second seats, respectively.

9. A pressure regulator for controlling the flow of a pressurized fluid, the pressure regulator comprising:
   a housing having a proximal end, a distal end, and a plurality of chambers connecting at least one inlet channel to at least one out channel such that the pressurized fluid flows through the at least one inlet channel into the chambers and out of the chambers through the at least one outlet channel;
   a pressure-balanced valve assembly disposed within the housing, the valve assembly comprising:
      a first seat cartridge comprising a first seat;
      a first poppet positioned to close against the first seat to prevent the flow of the pressurized fluid through a first of the chambers;
      a second seat cartridge comprising a second seat;

a second poppet coaxial with the first poppet and positioned to close against the second seat to prevent the flow of the pressurized fluid through a second of the chambers;

each of the first and second poppets having a proximal end, a distal end, and a knife edge that projects from the distal end and contacts the respective seat to create a bubble-tight seal, the knife edge of the first poppet facing into the pressure of the pressurized fluid and the knife edge of the second poppet facing away from the pressure of the pressurized fluid;

a valve actuator configured to simultaneously open both seals between the poppets and the seats;

wherein the first seat cartridge further comprises:

a holder that contacts a proximal end and an inner surface of the first seat; and a retainer that threadedly mates with the holder of the first seat cartridge and extends over and pushes down on the first seat to retain the first seat in place, leaving a poppet-contacting portion of the first seat that receives the knife edge of the first poppet; and wherein the second seat cartridge further comprises:

a holder that contacts a proximal end and an inner surface of the second seat; and a retainer that threadedly mates with the holder of the second seat cartridge and extends over and pushes down on the second seat to retain the second seat in place, leaving a poppet-contacting portion of the second seat that receives the knife edge of the second poppet.

10. The pressure regulator of claim 9, wherein the holder of each of the first and second seat cartridges comprises one or more teeth projecting from a proximal surface of the holder in contact with the first and second seat, respectively, one of the teeth being aligned with the knife edges of the first and second poppets, respectively.

11. The pressure regulator of claim 9, wherein the holder of the first seat cartridge abuts the distal end of the first poppet and comprises:

a holder chamber in fluid communication with one or more of the at least one inlet channel; and one or more apertures in fluid communication with the holder chamber and the first chamber, the seal between the first seat and the knife edge of the first poppet preventing the flow of the pressurized fluid from the apertures to the first chamber.

12. A pressure regulator for controlling the flow of a pressurized fluid, the pressure regulator comprising:

a housing having a proximal end, a distal end, and a plurality of chambers connecting at least one inlet channel to at least one out channel such that the pressurized fluid flows through the at least one inlet channel into the chambers and out of the chambers through the at least one outlet channel;

a pressure-balanced valve assembly disposed within the housing, the valve assembly comprising:

a first seat cartridge comprising a first seat;

a first poppet positioned to close against the first seat to prevent the flow of the pressurized fluid through a first of the chambers;

a second seat cartridge comprising a second seat;

a second poppet coaxial with the first poppet and positioned to close against the second seat to prevent the flow of the pressurized fluid through a second of the chambers;

each of the first and second poppets having a proximal end, a distal end, and a knife edge that projects from the distal end and contacts the respective seat to create a bubble-tight seal, the knife edge of the first poppet facing into the pressure of the pressurized fluid and the knife edge of the second poppet facing away from the pressure of the pressurized fluid;

a valve actuator configured to simultaneously open both seals between the poppets and the seats, wherein the valve actuator is a solenoid having a proximal and distal end and a cylindrical side;

a cover assembly attached to the housing and containing the solenoid; and a flange disposed between the housing and the cover assembly;

wherein the solenoid is substantially immersed in the pressurized fluid.

13. The pressure regulator of claim 12, wherein:

the cover assembly comprises a solenoid chamber in which the solenoid is retained, the solenoid chamber having hollow space around the side and distal end of the solenoid;

the flange comprises one or more flange channels in fluid communication with one or more of the at least one inlet channel and the solenoid chamber; and the solenoid comprises:

a shell abutting the flange and forming the side of the solenoid;

a cap abutting the shell and forming the distal end of the solenoid;

a gap plate extending partially over the cap and having one or more gap channels;

a core chamber in fluid communication with the solenoid chamber via the gap channels;

an armature disposed within the core chamber, the armature having one or more armature channels and abutting the gap plate when the solenoid is de-energized;

a lower pole piece attached to the flange and extending into the core chamber, the lower pole piece separated from the armature by an actuation gap when the solenoid is de-energized;

an axial chamber disposed within the armature, extending proximally through the lower pole piece, and being in fluid communication with the core chamber via the armature channels; and a pushrod disposed in the axial chamber and projecting proximally out of the axial chamber and into contact with the first poppet when the solenoid is energized.

14. The pressure regulator of claim 13, wherein the solenoid further comprises:

a tube that forms the core chamber and a coil chamber between the shell and the tube; and a coil of wire disposed in the core chamber and insulated with a silicone sealant.

15. The pressure regulator of claim 14, wherein the tube of the solenoid comprises:

a portion of the flange extending distally;

a reluctor attached to the portion of the flange and extending distally; and an upper pole piece attached to the reluctor and to the gap plate;

wherein the actuation gap is aligned laterally with the reluctor.

16. A pressure regulator comprising:

a housing;

a cover assembly attached to the housing;

a pressure-balanced dual poppet valve contained in the housing for controlling flow of a pressurized fluid, each poppet of the valve having a knife edge that contacts a seat to create a bubble-tight seal, wherein one knife edge faces into the pressure of the fluid and the other knife edge faces away from the pressure of the fluid; and a direct-acting solenoid contained in the cover assembly, the solenoid comprising a pushrod that engages one of the poppets of the valve;

wherein energizing the solenoid simultaneously opens both seals between the poppets and the seats, and de-energizing the solenoid simultaneously closes both seals between the poppets and the seats;

wherein the solenoid is substantially immersed in the pressurized fluid.

\* \* \* \* \*